(12) United States Patent
Sashino et al.

(10) Patent No.: US 6,489,696 B2
(45) Date of Patent: *Dec. 3, 2002

(54) MOTOR HAVING ROTOR FORMED BY USING THERMOSETTING RESIN

(75) Inventors: Masahiro Sashino, Tottori (JP); Masaaki Matsubara, Tottori (JP); Tomiaki Sakano, Osaka (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/569,484

(22) Filed: May 11, 2000

(65) Prior Publication Data
US 2002/0047329 A1 Apr. 25, 2002

(30) Foreign Application Priority Data
May 13, 1999 (JP) ............................................. 11-132268

(51) Int. Cl.[7] ........................ H02K 1/04; H02K 21/12; H02K 1/22
(52) U.S. Cl. .................... 310/43; 310/260; 310/156.38; 310/156.01; 310/156.08; 310/156.12; 310/156.72
(58) Field of Search ........................ 310/43, 90.5, 154, 310/156.38, 156, 261, 49 R; 260/42.18; 428/36.4

(56) References Cited

U.S. PATENT DOCUMENTS

| 3,998,179 | A | * | 12/1976 | Dieterich et al. | ....... 116/129 D |
| 4,128,527 | A | * | 12/1978 | Kinjo et al. | ............. 260/42.18 |
| 4,159,301 | A | * | 6/1979 | Buser et al. | ................ 264/331 |
| 4,387,311 | A | * | 6/1983 | Kobayashi et al. | ........... 310/43 |
| 4,529,900 | A | * | 7/1985 | Uzuka | ......................... 310/43 |
| 4,624,884 | A | * | 11/1986 | Harada et al. | .............. 428/218 |
| 4,742,811 | A | * | 5/1988 | Okada et al. | ............... 123/617 |
| 4,843,269 | A | * | 6/1989 | Shramo | ...................... 310/208 |
| 4,853,434 | A | * | 8/1989 | Block | ........................ 525/100 |
| 4,933,581 | A | * | 6/1990 | Shramo | ........................ 310/86 |
| 5,047,205 | A | * | 9/1991 | Chandhok et al. | ............. 419/8 |
| 5,329,201 | A | * | 7/1994 | Shirasaki | ..................... 310/323 |
| 5,486,728 | A | * | 1/1996 | Hirama | ................. 310/40 MM |
| 5,684,352 | A | * | 11/1997 | Mita et al. | ................... 310/156 |
| 5,705,970 | A | * | 1/1998 | Nishida et al. | ............. 335/303 |
| 5,783,890 | A | * | 7/1998 | Mulgrave | .................... 310/156 |
| 5,830,548 | A | * | 11/1998 | Andersen et al. | .......... 428/36.4 |
| 5,838,082 | A | * | 11/1998 | Ito et al. | .................... 310/90.5 |
| 5,861,695 | A | * | 1/1999 | Brassard | ..................... 310/154 |
| 5,907,205 | A | * | 5/1999 | Herman et al. | ............. 310/152 |
| 6,002,186 | A | * | 12/1999 | Coutu et al. | ............... 310/49 R |

FOREIGN PATENT DOCUMENTS

| JP | 2084032 A | * | 3/1990 | ............ H02K/1/27 |
| JP | 2307341 A | * | 12/1990 | ............ H02K/1/27 |
| JP | 402307341 A | * | 12/1990 | |
| JP | 06217479 | | 8/1994 | |
| JP | 406217479 A | * | 8/1994 | |

* cited by examiner

Primary Examiner—Nestor Ramirez
Assistant Examiner—Julio Gonzalez Ramirez
(74) Attorney, Agent, or Firm—RatnerPrestia (57) ABSTRACT

A rotor of a motor has a cylindrical magnet coaxially disposed with a shaft. The shaft and the magnet are bonded with thermosetting resin formed by injection molding. Since the molding shrinkage of the thermosetting resin is so small that a high preciseness is achieved in the motor structure. This precision structure can reduce vibration due to unbalance of a rotor. Also, an annealing process, in which a motor is left at a temperature higher than the limit temperature for operating the motor, can be eliminated. As a result, the efficiency of producing the motor can be improved.

12 Claims, 6 Drawing Sheets

Runout of circumference of rotor magnet

| Material | Maximum value in specifications | Mean value |
|---|---|---|
| Thermoplastic resin (PBT) | 100μm$_{p-p}$ | 70μm$_{p-p}$ |
| Thermosetting resin | 50μm$_{p-p}$ | 30μm$_{p-p}$ |

FIG. 4

Weight density ratio of thermoplastic resin (%)

FIG. 5

Weight density ratio of glass fiber (%)

MOTOR HAVING ROTOR FORMED BY USING THERMOSETTING RESIN

FIELD OF THE INVENTION

The present invention relates to a stepping motor used mainly for a data processing apparatus, and, more particularly, the invention relates to the structure of a rotor for the stepping motor and material used for forming the rotor.

BACKGROUND OF THE INVENTION

In recent years, under the circumstance that the performance of a data processing apparatus is improved, the improvement of the performance of a stepping motor used for the apparatus is also required.

In regard to the improvement of the performance of the motor, the decrease of the vibration and the noise of the motor, and the improvement of the efficiency of the motor are mostly required. At the same time, the improvement of the productivity of the motor having high performance is also required.

In general, a rotor for the stepping motor has the structure that a cylindrical magnet and a shaft are united with a molded-member, and, in a conventional motor, the molded-member has been formed of thermoplastic resin added fillers such as polyethylene terephthalate (PET) or polybutylene terephthalate (PBT).

In the following, the rotor for the conventional motor is described on reference to FIG. 7 and FIG. 8 which are cross sectional views showing the rotors having respectively different structure.

Figure 7:
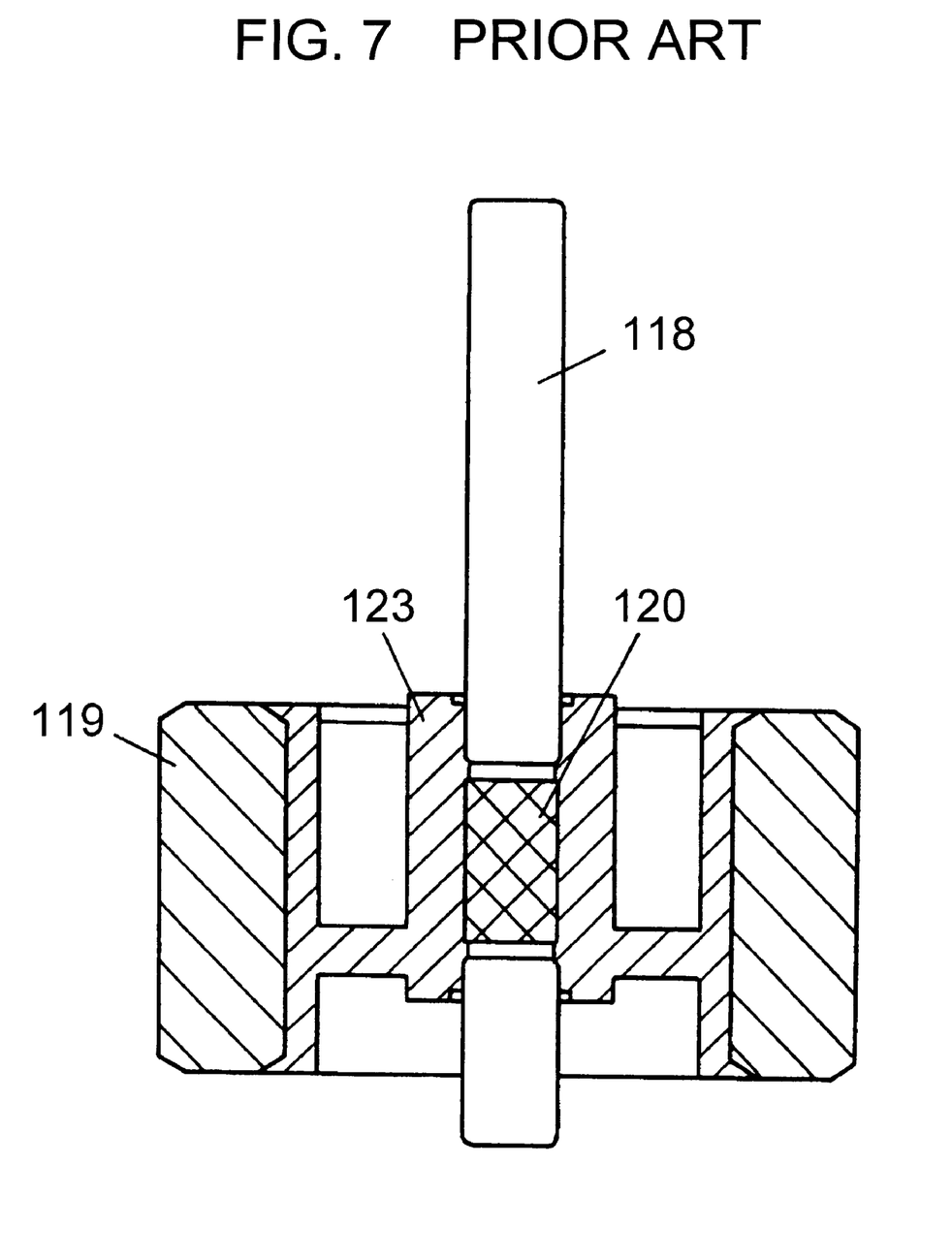
FIG. 7 is a cross sectional view showing a rotor of a conventional stepping motor.

In FIG. 7, a cylindrical magnet 119 having a plurality of magnetized poles along the circumference thereof and a shaft 118 are united in the state that the shaft 118 and the cylindrical magnet 119 are coaxially disposed, with a molded-member 123 formed by injection molding. The injection molding is performed in such a manner that the thermoplastic resin is injected into a space formed between the cylindrical magnet 119 and the shaft 118. The shaft 118 has a knurled portion 120 on the surface thereof for increasing the strength of uniting the shaft 118 and the molded-member 123.

Figure 8:
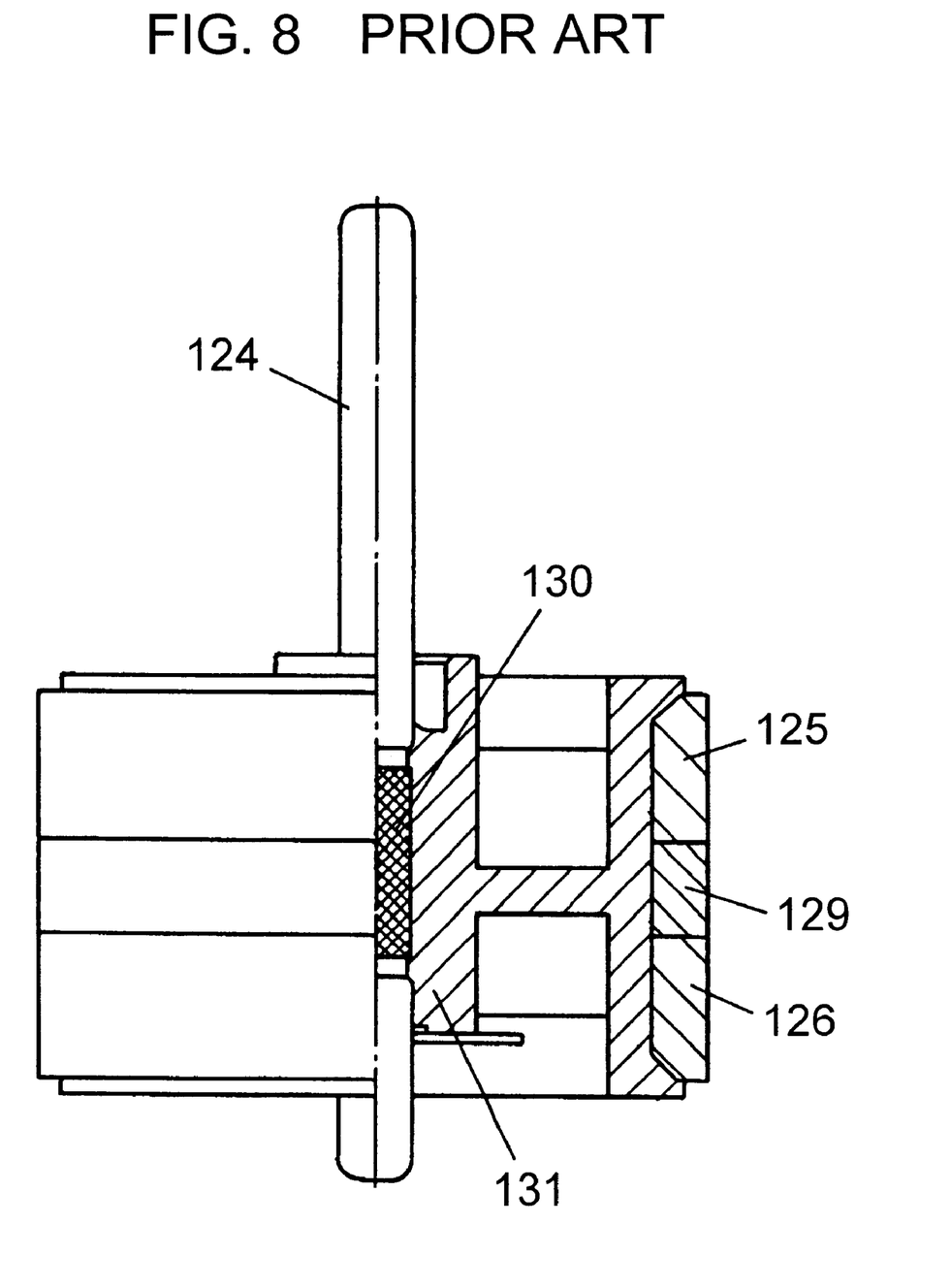
FIG. 8 is a cross sectional view showing another rotor, which has a spacer, in the conventional stepping motor.

In FIG. 8, a first cylindrical magnet 125 and a second cylindrical magnet 126, each of which has a plurality of magnetized poles along the circumference thereof, an annular spacer 129 which is disposed between the first magnet 125 and the second magnet 126, and a shaft 124 are united in the state that all of these components of the rotor are coaxially disposed, with a molded-member 131 formed with the thermoplastic resin in a manner similar to the above description on FIG. 7. The shaft 124 has a knurled portion 130 on the surface thereof for increasing the strength of uniting the shaft 124. and the molded-member 131.

However, in the conventional rotor in which the molded-member (123 or 131) is formed with the thermoplastic resin, the sufficient dimensional preciseness of the rotor is hardly obtained since the molding shrinkage of the thermoplastic resin in forming the molded-member and the shrinkage of the molded-member after the molding are large.

For improving the dimensional preciseness of the rotor, a proposal is disclosed in Japanese Patent Publication No. 2640413. According to the publication, it is described that the vibration and the noise of the motor can be reduced by forming the molded-member with a liquid crystal polymer in place of PBT or metal which has been conventionally used, since the vibration damping characteristic of a liquid crystal polymer is superior than that of the thermoplastic resin or metal. Also, it is described in the publication that the vibration of the motor can be reduced because the inertia of the rotor is reduced by using a liquid crystal polymer in place of metal. Also, it is described in the publication that the dimensional preciseness of the rotor can be maintained after the molding process of the molded-member by using a liquid crystal polymer, and it is also described that the efficiency of producing the rotor can be improved because the fluidity of a liquid crystal polymer is superior.

It is known that a liquid crystal polymer is superior than the thermoplastic resin in the characteristics described above, such that the improvement from the conventional motor can be expected by using a liquid crystal polymer.

However, a liquid crystal polymer has a characteristic that the molding shrinkage largely changes depending on the flowing direction thereof in a molding process. That is, the molding shrinkage ratio of a liquid crystal polymer is 0.15% in the flowing direction, and 0.45% in the right angle direction of the flowing direction. On the other hand, the molding shrinkage ratio of thermoplastic resin such as PBT is as large as approximately 0.3%–1% though the directional dependency (i.e., the change of molding shrinkage due to the flowing direction) is not large. As the above figures show, although the molding shrinkage of a liquid crystal polymer is small in the flowing direction comparing with that of the thermoplastic resin, the molding shrinkage in the right angle direction of the flowing direction is considerably large. Therefore, in using a liquid crystal polymer for the molded-member which unites the components of the rotor, it is necessary to pay attention on the shape of a mold for forming the molded-member, and on the gating of the mold, also it is necessary to pay attention on the method for preventing the decrease of mechanical strength at the weld line of the molded-member.

Also, although it is described in the publication that the fluidity of a liquid crystal polymer is superior than that of the thermoplastic resin, the pressure required for forming the molded-member by the injection molding of a liquid crystal polymer is as high as 300 kg/cm$^2$, which result in the occurrence of damage on the magnet, which is rather fragile, in the production process of the rotor. Due to the above disadvantage of a liquid crystal polymer, a rotor having a cylindrical magnet whose axial dimension is relatively large against the inside diameter of the cylindrical magnet is hardly produced by using a liquid crystal polymer.

Also, in the case where a rotor having large inertia is required, neither liquid crystal polymer nor the thermoplastic resin is hardly used due to the large molding shrinkage. That is, in the case where the material such as metal, whose specific gravity is large, is used for the spacer 129 for increasing the inertia of the rotor, the vibration of the motor becomes large since sufficient shaft balance of the rotor is hardly obtained by using a liquid crystal polymer or the thermoplastic resin due to the molding shrinkage characteristic described above.

SUMMARY OF THE INVENTION

The object of the present invention is to address the problems in the conventional stepping motor, and to provide a stepping motor having a rotor which has a good shaft balance for reducing the runout of the circumference of the magnet of the rotor, by which the vibration and the noise of the motor can be reduced and the efficiency of the motor can be improved. A further object of the present invention is to provide a low cost and high performance motor having a rotor which has relatively long axial dimension against the diameter of the rotor for improving the response characteristic of the motor by reducing the inertia of the rotor. A still further object of the present invention is to provide a low cost and high performance motor having a rotor whose inertia is large in the case where such a rotor is required.

For realizing the above object, the motor of the present invention comprises the following elements.

(a) a rotor including
   a cylindrical magnet having a plurality of poles magnetized in a circumference direction; and
   a shaft coaxially incorporated into the magnet with a molded member made of thermosetting resin,
(b) a stator facing to the rotor via an air space.

In the above structure, since the molding shrinkage of the thermosetting resin contained in the mixture is small, the dimensional preciseness of the rotor can be improved, also, the process for annealing the molded-member can be exempted. Also, since the mixture containing thermosetting resin has a superior fluidity characteristic, a motor having a long and narrow rotor (i.e., a rotor whose relative axial dimension against the inside diameter of the cylindrical magnet of the rotor is more than 0.3) can be produced efficiently, such that a motor having superior response characteristic and less vibration can be realized.

Also, for realizing the above object, the motor of the present invention has the following elements.

(a) a rotor including:
   two cylindrical magnets having a plurality of poles magnetized in a circumference direction and disposed coaxially with each other;
   a spacer having a section contacting with inner walls of the two magnets and a section separating the two magnets;
   a shaft incorporated with the magnets and the spacer coaxially with a molded member formed of thermosetting resin; and
(b) a stator facing to the rotor via an air space.

In the above structure also, since the thermal shrinkage of the mixture containing thermosetting resin is smaller than that of the thermoplastic resin and that of a liquid crystal polymer, dimensional preciseness of the rotor can be improved, such that the shaft balance of the rotor is improved. As a result, in the case where a motor comprising a rotor having large inertia is required, such a motor can be obtained by using a spacer whose specific gravity is larger than that of the molded-member, in which the vibration of the rotor is reduced to a sufficiently low level.

DETAILED DESCRIPTION OF THE INVENTION

Hereinafter exemplary embodiments of the present invention are described on reference to illustrations.

First Exemplary Embodiment

Figure 1:
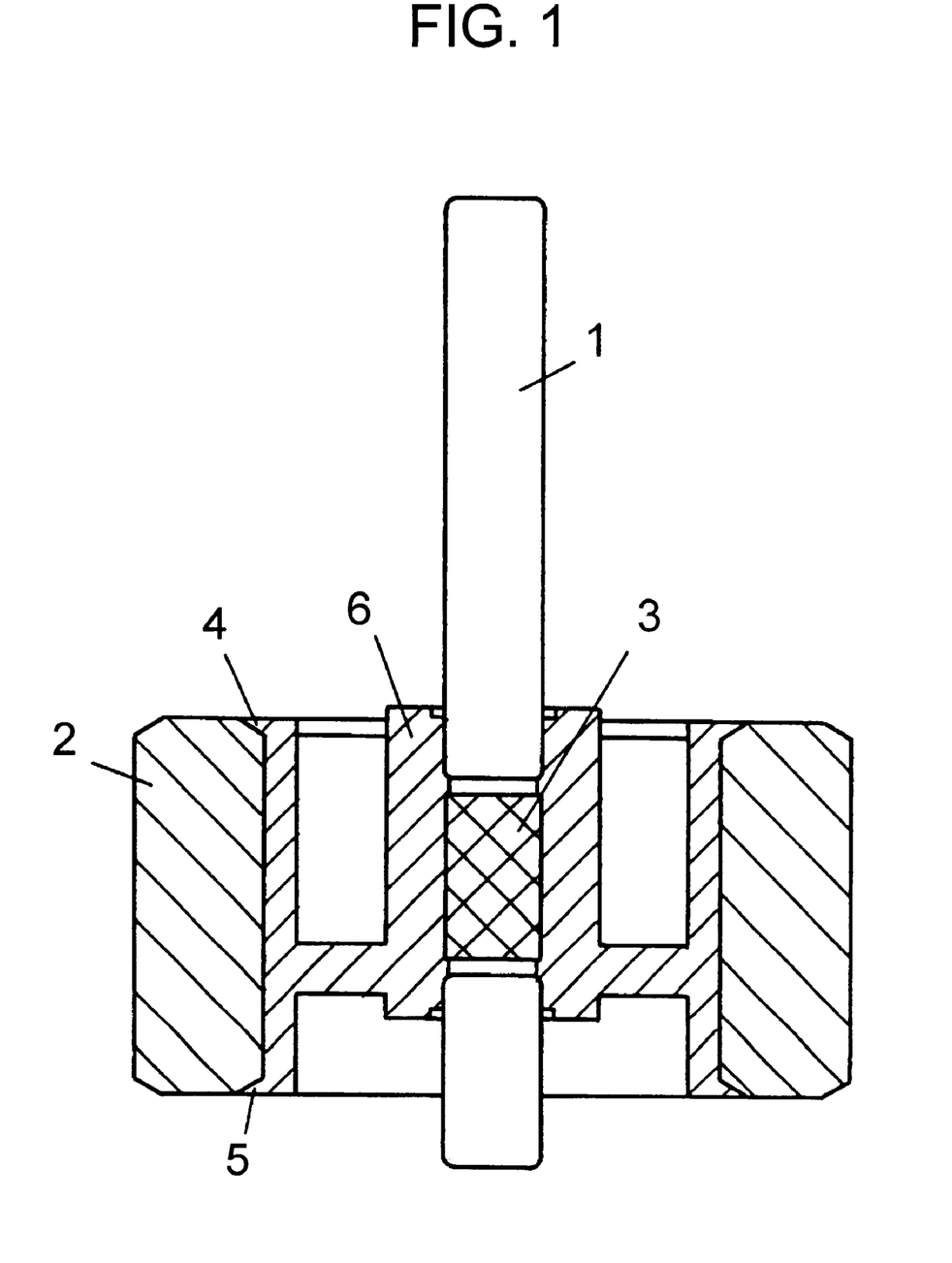
FIG. 1 is a cross sectional view showing the rotor of a stepping motor in a first exemplary embodiment in the present invention.
Figure 2:
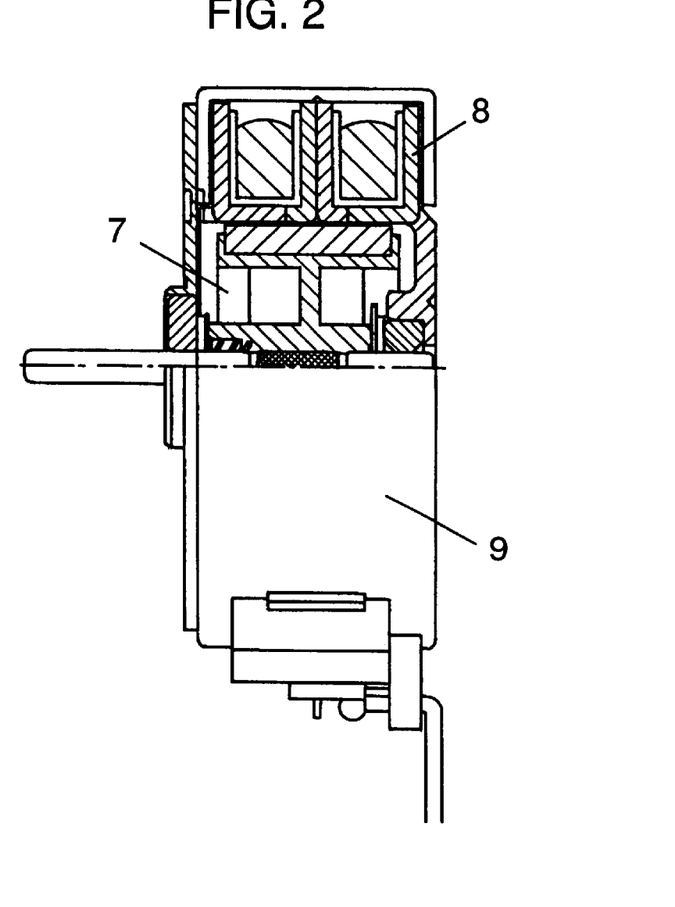
FIG. 2 is a cross sectional view showing the stepping motor in the first exemplary embodiment in the same.

FIG. 1 is a cross sectional view showing the rotor of a stepping motor in the first exemplary embodiment in the present invention. FIG. 2 is a cross sectional view showing the stepping motor in the first exemplary embodiment in the same.

In FIG. 1, the rotor of this exemplary embodiment comprises a shaft 1, a cylindrical magnet 2 and a molded-member 6. The cylindrical magnet 2 having a plurality of magnetized poles along the circumference thereof and the shaft 1 are united in the state that the shaft 1 and the magnet 2 are coaxially disposed, with a molded-member 6 formed with a mixture containing thermosetting resin. A knurled portion 3 is formed on the surface of the shaft 1 for increasing the strength of uniting the shaft 1 and the molded-member 6. Also a first slip preventing portion (i.e., chamfer, cavity or the like) 4 and a second slip preventing portion 5 are formed at both end portions of the inner wall of the magnet 2 for increasing the strength of uniting the magnet 2 and the molded-member 6.

FIG. 2 shows the structure of the stepping motor of this exemplary embodiment. That is, in FIG. 2, in a frame 9, a rotor 7 having the structure which is similar to that of FIG. 1 and a stator 8 having a plurality of windings are disposed in the state that the plurality of magnetized poles on the circumference of the magnet of the rotor 7 face toward the plurality of windings of the stator 8 via an annular air space 21.

In this exemplary embodiment, the molded-member 6 is formed of thermosetting resin which has a characteristic that the molding shrinkage is smaller than that of the thermoplastic resin and that of a liquid crystal polymer, such that the dimensional preciseness of the rotor can be improved, also the process for annealing the molded-member 6 in producing the rotor (i.e., the process of annealing the molded-member 6 in such a manner that the assembled rotor having the molded-member 6 is put during a predetermined period under a predetermined ambient temperature which is higher than the upper limit of the temperature in the ordinary use of the motor comprising the rotor) can be exempted.

Also, since the viscosity of the thermosetting resin in this exemplary embodiment is approximately 300,000 cm poise which is much lower than the approximate viscosity 2,000,000 cm poise of the thermoplastic resin, such that the molding pressure for the mixture in this exemplary embodiment can be set at as low as 30 kg/cm$^2$ comparing with 500 kg/cm$^2$ for the thermoplastic resin. As is described above, since the viscosity in this exemplary embodiment is low, a rotor having an axially long and narrow cylindrical magnet, whose relative axial dimension against the inside diameter of the cylindrical magnet is more than approximately 0.3, can be produced efficiently. In such a motor, the. inertia of the rotor can be reduced for improving the response characteristic of the motor, also the vibration of the motor can be reduced.

The thermosetting resin of this exemplary embodiment preferably includes unsaturated polyester resin whose weight density ratio of approximately 10%–30%. The curing time of the unsaturated polyester resin is shorter than that of the other thermosetting resin such as epoxy resin, phenol resin, or the like, such that the time required for forming the molded-member 6 is reduced by using the mixture containing unsaturated polyester resin, whereby the production of the rotor can be performed efficiently and the production cost of the rotor is reduced accordingly.

In the case where the weight density ratio of unsaturated polyester resin in the mixture is less than approximately 10%, the surface of the molded-member 6 formed with the mixture becomes like sand, and the mechanical strength of the molded-member 6 decreases, such that the molded-member 6 splits off from the shaft 1. On the other hand, in the case where the weight density ratio of unsaturated polyester resin in the mixture is more than approximately 30%, the viscosity of the mixture increases (i.e., the fluidity of the mixture decreases), such that high molding pressure is required. That. is, in the case where the weight density ratio of unsaturated polyester resin in the mixture is approximately 10%–30%, the problems described above can be avoided, and sufficient mechanical strength of the molded-member 6 is obtained, also the sufficiently low level of molding shrinkage and thermal expansion of the mixture are obtained, such that a high quality rotor can be produced by using the mixture, whereby the quality of the motor comprising the rotor is also improved.

Figure 3:
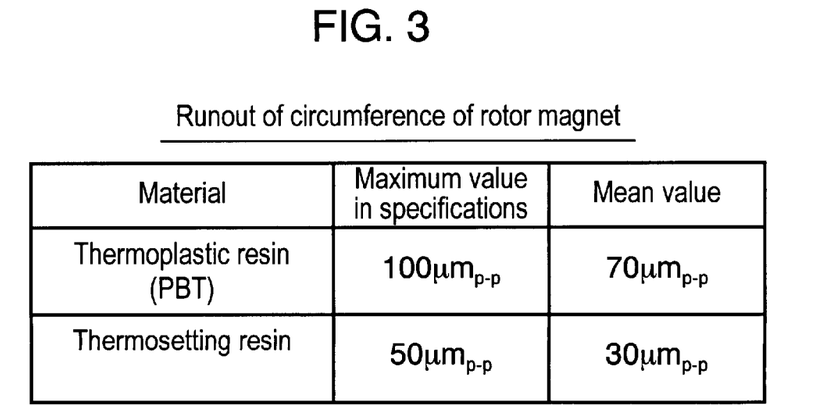
FIG. 3 shows the data comparing the runout of the circumference of the magnet of the-rotor in the occasion of using the thermoplastic resin with that in the occasion of using a mixture containing thermosetting resin in the first exemplary embodiment in the same.

FIG. 3 shows the data comparing the runout of the circumference of the magnet of the rotor in the occasion of using the thermoplastic resin (PBT) with that in the occasion of using the mixture containing the above weight density ratio of thermosetting resin (i.e., unsaturated polyester resin), The data of FIG. 3 show that, in the case where the thermoplastic resin is used, the runout of the circumference of the cylindrical magnet 2 is approximately 70 $\mu m_{p-p}$ in the mean value, and, in the case where the mixture containing the above weight density ratio of unsaturated polyester resin is used, the runout is reduced to approximately 30 $\mu m_{p-p}$ in the mean value. That is, by using the mixture containing the above weight density ratio of unsaturated polyester resin, the air space between the rotor 7 and the stator 8 can be reduced, such that the output power of the motor can be increased (i.e., the efficiency of the motor is improved).

The mixture of this exemplary embodiment includes a variation which contains both thermosetting resin and thermoplastic resin. In this case, the preferable weight density ratio of unsaturated polyester resin (i.e., thermosetting resin) in the mixture is approximately 10%–30%, and the preferable weight ratio of the thermoplastic resin against the unsaturated polyester resin contained in the mixture is approximately 10%–30%.

In the occasion of forming the molded-member 6 with the above mixture containing both thermosetting resin (i.e., unsaturated polyester resin) and thermoplastic resin, the thermoplastic resin remains liquefied when the unsaturated polyester resin is cured in the mold by heat applied to the mixture. In more detail, when heat is applied to the mixture, the thermoplastic resin dispersed in the mixture generates high pressure since the coefficient of thermal expansion of thermoplastic resin is large, and the thermoplastic resin works for preventing the shrinkage of the mixture, such that the mixture cures forming cellular structure in the mold. After that, the thermoplastic resin cures in the cellular structure when the mixture is cooled down. The above structure realizes high dimensional preciseness of the rotor.

The thermoplastic resin added to the above mixture is, styrene plastic, saturated polyester resin, acrylic resin or acetate resin. The resin is added to the mixture in the state that the resin is dissolved into styrene. These resins can be uniformly dispersed into the thermosetting resin contained in the mixture and have high durability against heat, also economically obtainable.

Figure 4:
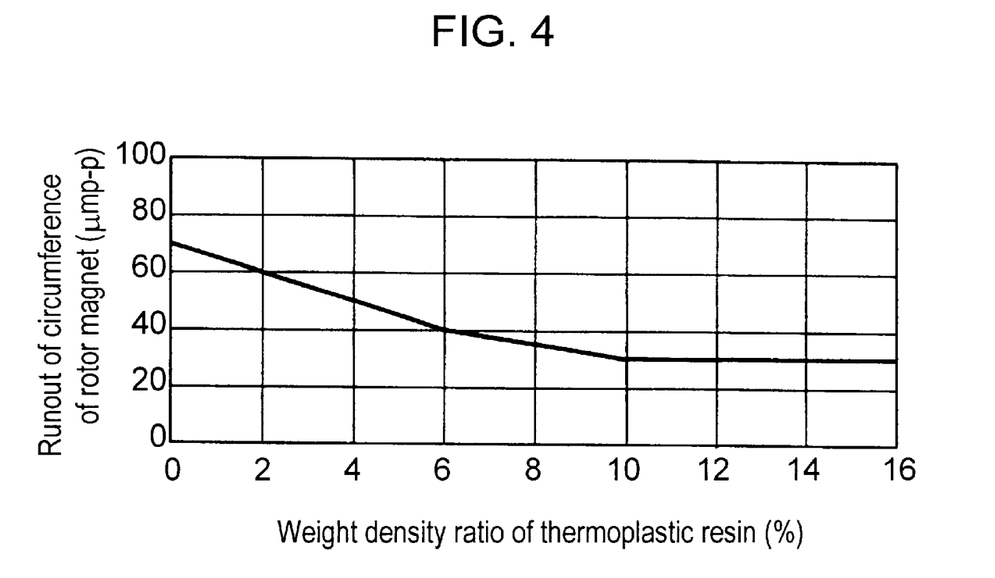
FIG. 4 shows the relation between the runout of the circumference of the magnet of the rotor and the weight density ratio of thermoplastic resin in the mixture containing thermosetting resin in the first exemplary embodiment in the same.

FIG. 4 shows the relation between the runout of the circumference of the magnet of the rotor and the weight density ratio of the thermoplastic resin contained in the mixture of this exemplary embodiment.

As shown in FIG. 4, the runout of the circumference of the magnet 2 comes down to the lowest level in the range where the weight density ratio of the thermoplastic resin in the mixture is approximately 10%–15%.

As is described above, by adding the above weight density ratio of thermoplastic resin to the mixture containing thermosetting resin, the effect of reducing the runout of the magnet 2 becomes larger, such that the air space formed between the rotor 7 and the stator 8 can be further reduced. As a result, the output power of the motor further increases (i.e., the efficiency further increases), also the vibration and the noise of the motor can be further reduced.

Also, the mixture of this exemplary embodiment includes another variation which contains thermosetting resin and glass fiber. In this case, the preferable weight density ratio of thermosetting resin (i.e., unsaturated polyester resin) in the mixture is approximately 10%–30%, and the preferable weight density ratio of glass fiber in the mixture is approximately 5%–15%.

Figure 5:
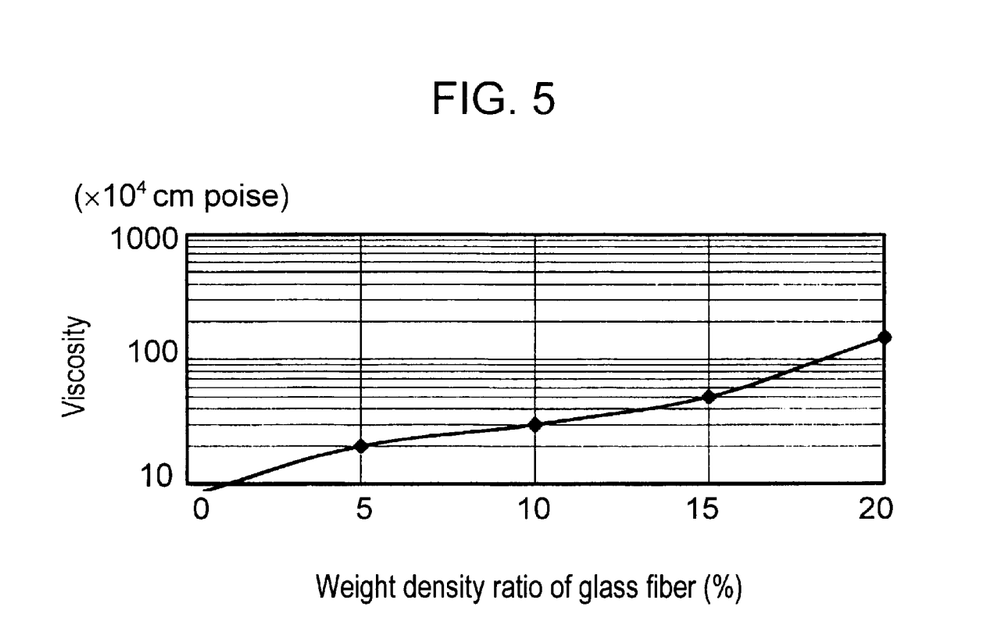
FIG. 5 shows the relation between the viscosity of the mixture containing thermosetting resin and the weight density ratio of glass fiber in the mixture in the first exemplary embodiment in the same.

FIG. 5 shows the relation between the viscosity of the mixture and the weight density ratio of glass fiber in the mixture in this exemplary embodiment.

As shown in FIG. 5, in the range where the weight density ratio of glass fiber in the mixture is approximately 5%–15%, the viscosity of the mixture is approximately 200,000 cm poise–500,000 cm poise. In this level of viscosity, the molded-member 6 can be formed with sufficiently low molding pressure without damaging the magnet 2.

As a result, by forming the molded-member 6 with the mixture containing thermosetting resin and glass fiber, a thin and small motor, which has sufficient mechanical strength, can be obtained.

Second Exemplary Embodiment

Figure 6:
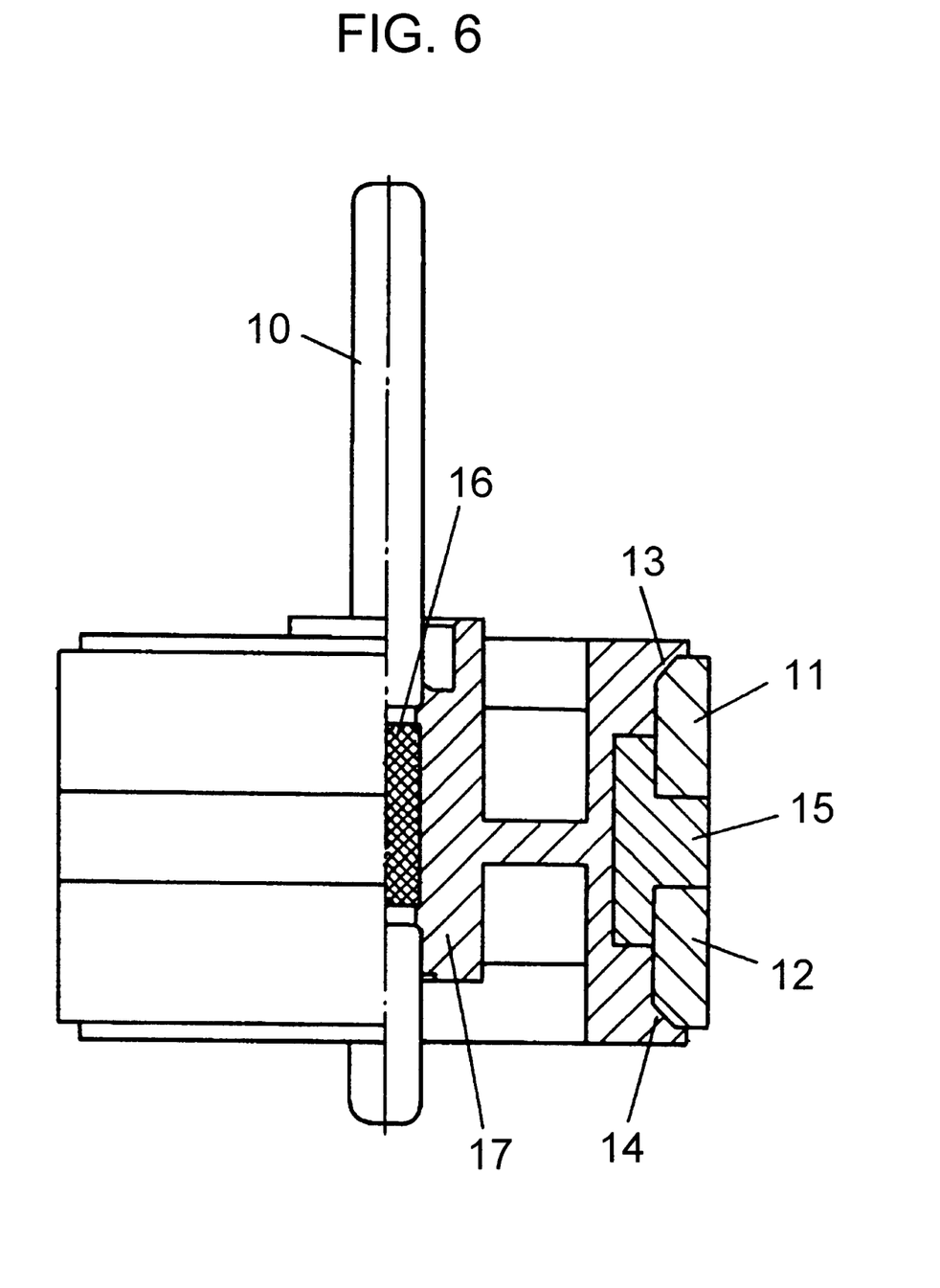
FIG. 6 is a cross sectional view showing the rotor of a stepping motor in a second exemplary embodiment in the same.

FIG. 6 is a cross sectional view showing a rotor of a stepping motor in the second exemplary embodiment in the present invention.

In FIG. 6, the rotor of this exemplary embodiment comprises a shaft 10, a first cylindrical magnet 11, a second cylindrical magnet 12, a spacer 15 and a molded-member 17. A knurled portion 16 is formed on the surface of the shaft 10 for increasing the strength of uniting the shaft 10 and the molded member 17. The first cylindrical magnet 11 has a plurality of magnetized poles along the circumference thereof, and a slip preventing portion 13 at the end of the inner wall thereof. The second cylindrical magnet 12 also has a plurality of magnetized poles along the circumference thereof, and a slip preventing portion 14 at the end of the inner wall thereof. A spacer 15 having a T-shaped cross section has a portion which spatially separates the first magnet 11 from the second magnet 12 and a first contact portion which contacts with the inner wall of the first magnet 11 and a second contact portion which contacts with the inner wall of the second magnet 12. The shaft 10, the first magnet 11, the second magnet 12; the spacer 15 are united with a molded-member 17 in the state that all of these components of the rotor are coaxially disposed.

In the above structure also, sufficient coaxial positional preciseness of the first magnet 11, the second magnet 12 and the spacer 15 can be realized by forming the molded-member 17 with the mixture described in the first exemplary embodiment. That is, in the motor of this exemplary embodiment also, the runout of the circumference of each of the first magnet 11, the second magnet 12, and the spacer 15 can be sufficiently reduced (i.e., sufficient shaft balance of the rotor can be realized). As a result, in the case where a rotor having large inertia is required, such a rotor, in which the vibration thereof is reduced to a sufficiently low level, can be obtained by using a spacer made of metal, for instance, whose specific gravity is larger than that of the molded-member 17.

The molded-member 17 of this exemplary embodiment has the structure of insertion molding in uniting the first magnet 11, the second magnet 12, the spacer 15 and the shaft 10. That is, the molded-member 17 is formed in such a manner that the above components of the rotor are disposed at respective predetermined positions in a mold for forming the rotor in advance, and these components are fixed at the respective disposed positions by the injection molding of the mixture described in the first exemplary embodiment, such that both coaxial and axial dimensional preciseness of the rotor is improved. Thus a motor of high performance (i.e., low vibration, low noise and high efficiency) can be produced efficiently since the first magnet 11, the second magnet 12, the spacer 15, and the shaft 10 are united with the molded-member 17 efficiently in the state that the positional preciseness of these components of the rotor is maintained.

As is described above, in the rotor of the motor of the present invention, the components of the rotor are united with the molded-member having the structure of insertion molding which is formed by injection molding of the mixture having the characteristic of small molding shrinkage, such that high dimensional preciseness of the rotor can be realized, whereby the runout of the circumference of the rotor is reduced, and the vibration and the noise of the motor are also reduced. Also, since the process for annealing the molded-member can be exempted, the efficiency of producing the motor can be improved. Also, since the molding shrinkage of the mixture of the present invention is small, the molded-member surely unites the components of the rotor, such that the reliability of the rotor is improved. Also, since the runout of the circumference of the rotor magnet is reduced, the dimension of the air space formed between the rotor magnet and the stator can be reduced, whereby a highly effective motor is obtained. Also, since the shaft balance of the rotor can be improved, a high performance (i.e., low vibration, low noise and less runout) motor is obtained.

Also, in the case where the spacer (having a T-shaped cross section e.g.) is used for the rotor, the motor comprising the rotor having large inertia can be obtained in the case where such a motor is required, by using, for the spacer, a material whose specific gravity is larger than that of the molded-member. In this case also, the vibration of the motor is reduced to a sufficiently low level since the shaft balance is improved by forming the molded-member with the mixture of the present invention.

Also, by forming the molded-member with a mixture containing the predetermined weight density of both thermosetting resin (i.e., unsaturated polyester resin) and thermoplastic resin, higher dimensional preciseness of the rotor can be realized, by which the characteristics of the motor comprising the rotor is improved.

As is described above, the present invention enables the improvement from the conventional motor, and, a motor having high quality and high performance can be obtained.

The application of the present invention is not limited to a stepping motor. That is, the present invention is applicable for any variation having the structure that a cylindrical rotor faces, via an air space, toward a stator disposed at the position of the radial direction of the rotor.

What is claimed is:

1. A motor comprising:
   (a) a rotor including:
      a cylindrical magnet including a plurality of poles;
      a shaft coaxially situated within said magnet; and
      a molded member comprising thermosetting resin, the thermosetting resin includes unsaturated polyester resin whose weight density ratio is not less than 10% and not more than 30%, said molded member located between said cylindrical magnet and said shaft;
   (b) a stator facing said rotor.

2. A motor comprising:
   (a) a rotor including:
      a cylindrical magnet including a plurality of poles; wherein a ratio of an axial height vs. an inner diameter of said magnet is not less than 0.3, a molded member comprising thermosetting resin, wherein the thermosetting resin includes unsaturated polyester resin whose weight density ratio is not less than 10% and not more than 30%, said molded member located between said cylindrical magnet and said shaft as said cylindrical magnet and shaft extend coaxially to each other;
   (b) a stator facing rotor.

3. A motor comprising:
   (a) a rotor including:
      two cylindrical magnets including a plurality of poles and disposed coaxially with each other;
      a spacer having a section contacting with inner walls of said two magnets and a section separating said two magnets, said spacer having a T-shaped cross-section;
      a shaft coaxially situated within said magnets and said spacer; and
      a molded member comprising thermosetting resin, wherein the thermosetting resin includes unsaturated polyester resin whose weight density ratio is not less than 10% and not more than 30%, said molded member being located between and in contact with said shaft and said magnets as said shaft and magnets extend coaxially to each other;
   (b) a stator facing said rotor.

4. A motor comprising:
   (a) a rotor including:
      a cylindrical magnet including a plurality of poles;
      a shaft coaxially situated within said magnet; and
      a molded member comprising thermosetting resin, wherein the thermosetting resin includes unsaturated polyester resin whose weight density ratio is not less than 10% and not more than 30%, and thermoplastic resin whose weight ratio with respect to the unsaturated polyester resin is not less than 10% and not more than 30%, said molded member located between said cylindrical magnet and said shaft;

(b) a stator facing said rotor.

5. A motor comprising:

(a) a rotor including:
a cylindrical magnet including a plurality of poles wherein a ratio of an axial height vs. an inner diameter of said magnet is not less than 0.3;
a shaft coaxially situated within said magnet; and
a molded member comprising thermosetting resin, wherein the thermosetting resin includes unsaturated polyester resin whose weight density ratio is not less than 10% and not more than 30%, and thermoplastic resin whose weight ratio with respect to the unsaturated polyester resin is not less than 10% and not more than 30%, said molded member located between said cylindrical magnet and said shaft;

(b) a stator facing said rotor.

6. A motor comprising:

(a) a rotor including:
two cylindrical magnets including a plurality of poles and disposed coaxially with each other;
a spacer having a section contacting with inner walls of said two magnets and a section separating said two magnets, said spacer having a T-shaped cross-section;
a shaft coaxially situated within said magnets and said spacer; and
a molded member comprising thermosetting resin, said molded member being located between and in contact with said shaft and said magnets as said shaft and magnets extend coaxially to each other, wherein the thermosetting resin includes unsaturated polyester resin whose weight density ratio is not less than 10% and not more than 30%, and thermoplastic resin whose weight ratio with respect to the unsaturated polyester resin is not less than 10% and not more than 30%, (b) a stator facing said rotor.

7. A motor comprising:

(a) a rotor including:
a cylindrical magnet including a plurality of poles;
a shaft coaxially situated within said magnet; and
a molded member comprising thermosetting resin, wherein the thermosetting resin includes unsaturated polyester resin whose weight density ratio is not less than 10% and not more than 30%, and glass fiber whose weight density ratio is not less than 5% and not more than 15%, said molded member located between said cylindrical magnet and said shaft;

(b) a stator facing said rotor.

8. A motor comprising:

(a) a rotor including:
a cylindrical magnet including a plurality of poles wherein a ratio of an axial height vs. an inner diameter of said magnet is not less than 0.3;
a shaft coaxially situated within said magnet; and
a molded member comprising thermosetting resin, wherein the thermosetting resin includes unsaturated polyester resin whose weight density ratio is not less than 10% and not more than 30%, and glass fiber whose weight density ratio is not less than 5% and not more than 15%, said molded member located between said cylindrical magnet and said shaft;

(b) a stator facing said rotor.

9. A motor comprising:

(a) a rotor including:
two cylindrical magnets including a plurality of poles and disposed coaxially with each other;
a spacer having a section contacting with inner walls of said two magnets and a section separating said two magnets, said spacer having a T-shaped cross-section;
a shaft coaxially situated within said magnets and said spacer; and
a molded member comprising thermosetting resin, wherein the thermosetting resin includes unsaturated polyester resin whose weight density ratio is not less than 10% and not more than 30%, and glass fiber whose weight density ratio is not less than 5% and not more than 15%, said molded member being located between and in contact with said shaft and said magnets as said shaft and magnets extend coaxially to each other;

(b) a stator facing said rotor.

10. A motor comprising:

(a) a rotor including:
a cylindrical magnet including a plurality of poles;
a shaft coaxially situated within said magnet; and
a molded member comprising thermosetting resin, wherein the thermosetting resin includes thermoplastic resin whose weight density ratio is not less than 10% and not more than 15%, said molded member located between said cylindrical magnet and said shaft;

(b) a stator facing said rotor.

11. A motor comprising:

(a) a rotor including:
a cylindrical magnet including a plurality of poles wherein a ratio of an axial height vs. an inner diameter of said magnet is not less than 0.3;
a shaft coaxially situated within said magnet; and
a molded member comprising thermosetting resin, wherein the thermosetting resin includes thermoplastic resin whose weight density ratio is not less than 10% and not more than 15%, said molded member located between said cylindrical magnet and said shaft;

(b) a stator facing said rotor.

12. A motor comprising:

(a) a rotor including:
two cylindrical magnets including a plurality of poles and disposed coaxially with each other;
a spacer having a section contacting with inner walls of said two magnets and a section separating said two magnets, said spacer having a T-shaped cross-section;
a shaft coaxially situated within said magnets and said spacer; and
a molded member comprising thermosetting resin, wherein the thermosetting resin includes thermoplastic resin whose weight density ratio is not less than 10% and not more than 15%, said molded member being located between and in contact with said shaft and said magnets as said shaft and magnets extend coaxially to each other;

(b) a stator facing said rotor.

* * * * *